Oct. 15, 1946.                G. L. RUSSELL                2,409,590
                           WORK HOLDING MEANS
                           Filed June 21, 1944
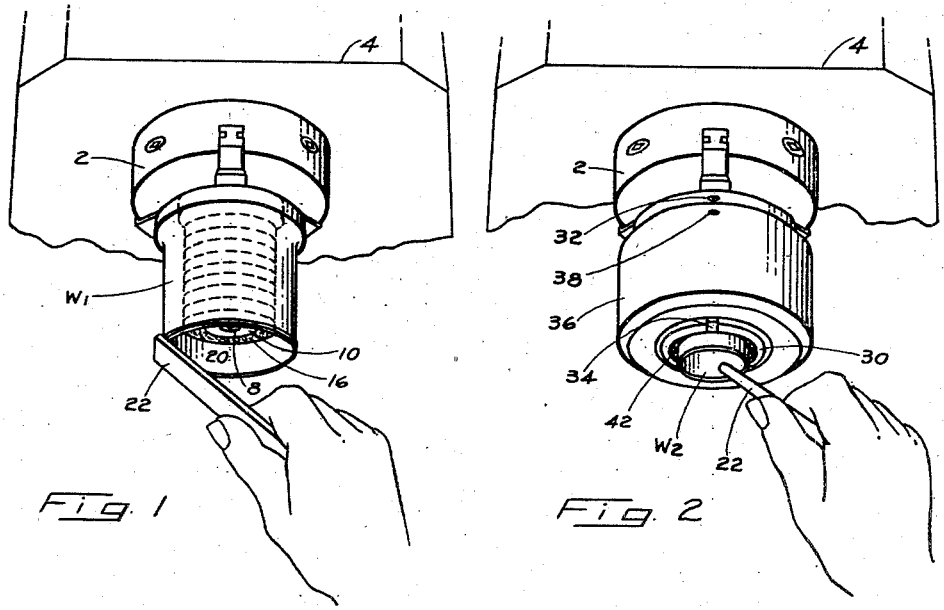
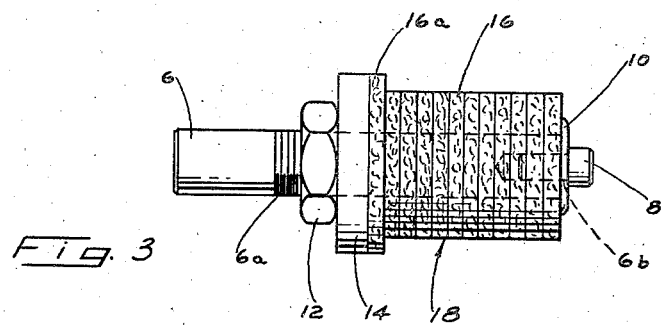
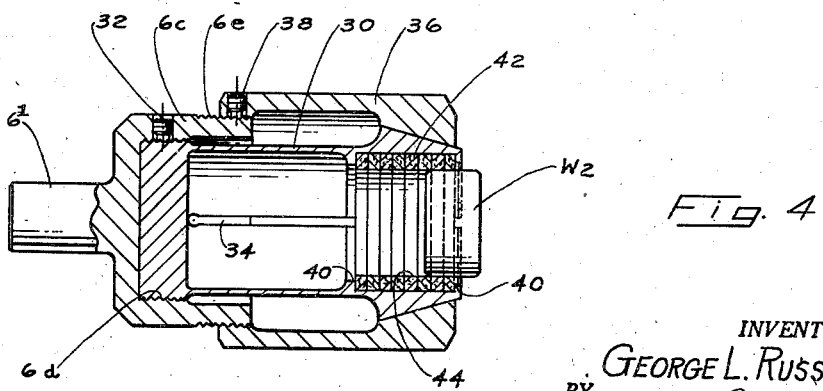
INVENTOR.
GEORGE L. RUSSELL
BY
ATTORNEY Patented Oct. 15, 1946

2,409,590

UNITED STATES PATENT OFFICE 2,409,590

WORK HOLDING MEANS

George L. Russell, Detroit, Mich., assignor to Ex-Cell-O Corporation, Detroit, Mich., a corporation of Michigan Application June 21, 1944, Serial No. 541,437

4 Claims. (Cl. 279—2)

The present invention has to do with quick locating and relatively impositive holding means for relatively light mechanical parts. Workpieces of this nature may be supported in my improved holding means for rotation by a conventional speed lathe or polishing lathe while the workpiece is held either on an external or an internal diameter thereof. The part, while thus held, may be subjected to one or more minor mechanical operations such as polishing, burring, breaking corners, smoothing fillets, etc., which may be done by an abrasive stick, abrasive cloth, brush, polishing pad or the like which may be held against the rotating workpiece positioned on or in my holding means.

My improved work holding means has its principal utility when a plurality of like workpieces in rapid succession are desired to have performed thereon one or more of the stated operations.

An important object of my invention is to provide a rotating work holder from which finished workpieces may be manually removed and unfinished work blanks may be replaced with a minimum of time and effort on the part of the operator and without altering the speed of rotation of the work holder from its normal working speed.

Another object is to enable workpieces of thin sections to be held thereby without danger of damage to the said pieces by distortion of the said sections.

A further object is to enable the work to be holdingly engaged by contact with previously finished or polished surfaces without danger that the said surfaces will be marred or damaged by contact with the holding means.

Other objects and advantageous features will appear as the description proceeds and consideration is given to the drawing in which:

Fig. 1 is a perspective view showing my work holding means supported for rotation in a conventional chuck of a conventional machine fragmentarily shown, a workpiece in the holding means, and a tool held in working relation with the workpiece;

Fig. 2 is a similar perspective view showing an alternative form of my work holding means supported for rotation in a conventional chuck, a workpiece held in working position within the work holding means, and a tool held in working relation with the workpiece;

Fig. 3 shows a work holding means of the sort shown in Fig. 1 separate from the conventional chuck and workpiece of Fig. 1; and Fig. 4 shows an axial section of a work holding means of the sort shown in Fig. 2 separate from the conventional chuck and workpiece of Fig. 2.

Referring more particularly to the drawing, in Figs. 1 and 2 are shown a conventional rotatable chuck 2, forming a part of a conventional speed or polishing lathe as fragmentarily indicated at 4. The chuck 2 is adapted to grip and hold the cylindrical portion of a shank or mandrel 6 which has a forwardly extending threaded portion 6a, and at its forward extremity an axial tapped hole 6b adapted to hold an adjustable retaining screw 8 and a retaining washer 10. Near the opposite end of the threaded portion 6a, a stop nut as at 12 may determine the position of a backing ring or washer 14. Between the washers 10 and 14 may be retained a suitable plurality of washers 16 of felt or some relatively deformable material preferably including at least one adjacent the backing washer of larger diameter than the others as at 16a. Adjustment of the screw 8 or the nut 12 or both serves to compress the washers and on each increase in the compression thereof, the outside diameters of the washers 16, which form a cylindrical work holding surface 18, tends to be increased in diameter so as to more closely fit and more tightly grip the internal cylindrical surface 20 of the axial bore in a workpiece W₁ which the holding means of Fig. 3 is adapted to hold.

Preferably the adjustment of nut 12 and/or screw 8 is such as to cause the outside diameter of the surface 18 to grip the surface 20 with sufficient frictional retentiveness to rotate the work W₁ while a hand held implement as at 22 is used to perform minor operations on the rotating workpiece as previously outlined. Preferably, however, the work should not be so tightly gripped that, without stopping or slowing the rotation of the work holding means of Fig. 3, the workpiece W₁ may not be grasped by the operator and disengaged from the frictional retention of the holding means and a like workpiece be manually replaced thereon without undue effort.

If the material for the washers 16 is suitably chosen (a number of felt materials have been found satisfactory), the workpiece bore 20 may be sufficiently tightly gripped to adequately rotate the work, yet be sufficiently loosely held to permit easy and rapid removal and replacement on the holding surface 18 and the bore of the workpiece, even though previously finished or polished, will not be marred thereby.

The work holding means of Fig. 4 is adapted to engage a workpiece W₂ on an external cylindrical surface thereof by coaction of a chuck engageable portion $6^1$ which has a forwardly extending bell-like portion $6c$ having an internal thread $6d$ and an external thread $6e$. A spring collet-like contractible member 30 is screwed into the thread $6d$ and locked by retaining screw 32. Member 30 is formed with a frustro-conical external surface adjacent its forwardmost end and a thin resilient tubular section intermediate said conical portion and the rearmost threaded portion. Three or any suitable number of slots 34 are cut from the forwardmost end toward the region of the thread $6d$ to define a plurality of jaws which may be resiliently sprung toward a closed position by a housing member 36 adjustably positionable on thread $6e$ and be lockable with screw 38, the forward end of member 36 being formed with an internally conical surface to coact with the external conical surface of member 30. The forward internal bore of member 30, internally of the external conical portion, is recessed to define axially spaced and facing inner and outer annular backing flanges 40, and to receive a plurality of annular rings 42 of a resilient material as described for washers 16 between and against said flanges. The inside diameters of these washers form a work holding diameter 44 adaptable by adjustment of member 36 to engage and hold the external diameter of a workpiece $W_2$ in a manner substantially as previously described for the holding of workpiece $W_1$ in like manner and for the same purpose excepting that workpiece $W_2$ is adapted to be held on an outside cylindrical diameter.

It will be understood that the illustrated support of neither of the alternative forms of my improved holding means as shown in Figs. 3 and 4 is to be limited to use exclusively with the specific form of chuck shown in Figs. 1 and 2. In certain instances it may be preferable to form the shaft 6 or $6^1$ of either of the work holding means with a flange permitting it to be bolted on a face plate of the rotating spindle of the machine means 4, thus substituting the face plate for the rotating chuck 2.

It will be seen that my invention is susceptible to changes in size, shape and arrangement of its parts without departure from the spirit of the same and it is my intention not to limit the invention except as defined by the appended claims.

I claim as my invention:

1. A work holding means comprising, in combination, a body having a shank at one end adapted to be secured in a work rotating means, an axially facing annular backing on said body, a plurality of annular work gripping washers supported coaxially in face to face engagement and collectively against said backing, all of said washers being composed of relatively deformable material, and means adjustable on the end of said body opposite said shank to vary the diameter of one peripheral surface of said washers adapted for engagement with the cylindrical surface of a workpiece and thereby to alter the frictional engagement of said washers with said workpiece.

2. A work holding means comprising, in combination, a spindle having a shank at one end adapted to be secured in a work rotating means and having a first threaded portion intermediate its ends and a second threaded portion at its outer end, a nut adjustably threaded on said first threaded portion, a backing ring slidable on said spindle and positioned against said nut, a plurality of washers slidably disposed in face-to-face engagement on said spindle and in position against said ring, and retaining means adjustably secured to said second threaded portion at said outer end of said spindle for engagement with the outermost one of said washers, all of said washers being composed of relatively deformable material, adjustment of either or both of said nut and said retaining means on said spindle toward each other serving to compress said washers axially and thereby to expand the diameter of said washers to frictionally engage the interior surface of an encircling workpiece.

3. A work holding means comprising, in combination, a spindle having an annular flange on one end, a collet member secured in said flange and having a plurality of split contractible resilient jaws formed on the exterior with a frusto-conical surface, the interior of said jaws being formed with an interrupted annular backing flange, a plurality of annular rings of resilient deformable material disposed in face-to-face engagement within said jaws against said backing flange, and a wedge clamping member adjustably threaded on said annular flange and formed with an internally conical surface coacting with said frusto-conical surface, whereby to contract said jaws so as to compress said washers into frictional engagement with the outer surface of a workpiece slidably inserted therein.

4. A work holding means comprising, in combination, a body having a shank at one end adapted to be secured in a work rotating means, an axially facing annular backing supported on said body, a plurality of annular work gripping washers supported coaxially in face to face engagement and collectively against said backing, said washers being composed of relatively deformable material, and means adjustable on said body and effective at the end thereof opposite said shank to compress said washers whereby to vary the diameter of one peripheral surface of said washers adapted for engagement with the cylindrical surface of a workpiece and thereby to alter the frictional engagement of said washers with said workpiece.

GEORGE L. RUSSELL.